(12) United States Patent
Ackley

(10) Patent No.: US 6,786,499 B2
(45) Date of Patent: Sep. 7, 2004

(54) SUSPENSION SYSTEM

(75) Inventor: Erick J. Ackley, Melbourne, FL (US)

(73) Assignee: Tempest Cycles, Inc., Miami Springs, FL (US)

( * ) Notice: Subject to any disclaimer, the term of this patent is extended or adjusted under 35 U.S.C. 154(b) by 0 days.

(21) Appl. No.: 10/407,475

(22) Filed: Apr. 3, 2003

(65) Prior Publication Data
US 2004/0094931 A1 May 20, 2004

Related U.S. Application Data

(60) Provisional application No. 60/426,688, filed on Nov. 15, 2002.

(51) Int. Cl.[7] ............................................... B62K 21/20
(52) U.S. Cl. ...................................... 280/276; 180/219
(58) Field of Search ............................... 280/276, 277, 280/279, 280; 180/219

(56) References Cited

U.S. PATENT DOCUMENTS

| | | | |
|---|---|---|---|
| 3,944,254 A | * | 3/1976 | Inui ........................... 280/276 |
| 4,067,543 A | | 1/1978 | Orth et al. |
| 4,162,797 A | * | 7/1979 | McBride ..................... 280/275 |
| 4,582,336 A | | 4/1986 | Onoda |
| 4,600,207 A | * | 7/1986 | Zosi ........................... 280/279 |
| 4,660,847 A | | 4/1987 | Yagasaki |
| 4,693,488 A | | 9/1987 | Bernocco |
| 4,702,338 A | | 10/1987 | Trema |
| 4,775,025 A | | 10/1988 | Parker et al. |
| 4,817,977 A | | 4/1989 | Bookbinder |
| 4,934,203 A | | 6/1990 | Bailey et al. |
| 5,029,667 A | | 7/1991 | Fujita et al. |
| 5,067,739 A | | 11/1991 | Kuan |
| 5,069,467 A | * | 12/1991 | Claudio ....................... 280/276 |
| 5,100,164 A | | 3/1992 | Miyamaru et al. |
| 5,118,126 A | | 6/1992 | Yaple |
| 5,156,231 A | | 10/1992 | Trema |
| 5,234,225 A | | 8/1993 | Yaple |
| 5,358,265 A | | 10/1994 | Yaple |
| 5,361,864 A | | 11/1994 | Tanaka |
| 5,623,855 A | | 4/1997 | Miles |
| 5,782,313 A | | 7/1998 | Kurawaki et al. |
| D418,089 S | | 12/1999 | Jackson |
| 6,017,047 A | * | 1/2000 | Hoose ......................... 280/276 |
| 6,402,175 B1 | * | 6/2002 | Jansson ....................... 280/276 |

FOREIGN PATENT DOCUMENTS

| | | |
|---|---|---|
| EP | 0 321 803 A2 | 6/1989 |
| EP | 0 399 964 A2 | 11/1990 |
| EP | 0 425 755 A | 5/1991 |
| EP | 0 621 171 A1 | 10/1994 |
| JP | 401204884 A | 8/1989 |
| JP | 01218986 A | 9/1989 |
| JP | 403178893 A | 8/1991 |
| JP | 05105172 A | 4/1993 |

* cited by examiner

Primary Examiner—Kevin Hurley
(74) Attorney, Agent, or Firm—Akerman Senterfitt; Gregory A. Nelson; Michael K. Dixon

(57) ABSTRACT

A suspension system for supporting a front wheel of a vehicle, such as a motorcycle, that includes at least one movement limiting device coupled to a support arm assembly and to a frame. The support arm assembly may support the front wheel and pivot about an axis that is generally orthogonal to a longitudinal axis of a vehicle and generally orthogonal to a longitudinal axis of the support arm assembly. The suspension system controls the amount of movement the support arm assembly undergoes about the pivot. The suspension system may be configured to absorb shock encountered in motorcycles having extreme rake.

33 Claims, 5 Drawing Sheets

US 6,786,499 B2

SUSPENSION SYSTEM

CROSS-REFERENCE TO RELATED APPLICATION

This application claims the benefit of U.S. Provisional Application No. 60/426,688, filed Nov. 15, 2002.

FIELD OF THE INVENTION

The invention is directed generally to suspension systems, and more particularly, to motorcycle suspension systems.

BACKGROUND

A conventional motorcycle, which is commonly referred to as a bike, typically includes at least one shock absorber on both the front and rear wheels for absorbing forces caused by changes in terrain or obstacles often encountered during use. Most often, at least one shock absorber, if not two or more, is positioned between the frame and the front wheel. The shock absorbers are generally juxtaposed and positioned parallel to the support arms to which the front wheel is attached. This configuration enables the shock absorbers to absorb forces that are parallel and perpendicular to the ground on which the motorcycle rests.

Configuring shock absorbers in this manner works well with motorcycles having support arms, which are also referred to as legs, that are orientated between a position that is generally orthogonal to a ground surface and a position at or less than an angle of about 36 degrees relative to a vertical axis. This angle is commonly referred to as a castor angle or rake. As the rake is increased beyond 36 to 40 degrees, shock absorbers positioned generally parallel to the support arms function poorly. This poor function is attributable to excessive rake and lateral forces on the fork, which increase friction on the support arms. Excessive rake limits a shock absorber's ability to slide easily, thereby defeating a shock absorber's intended function and ability to absorb forces caused by terrain and braking. Motorcycles having support arms positioned at angles greater than about 36 degrees relative to a vertical axis are commonly referred to as choppers.

When a shock absorber is positioned at an angle that is less than about 36 degrees, the force vectors generated by a change in terrain or by an obstacle encountered by the front wheel are absorbed by the shock absorber of the motorcycle. However, when a shock absorber is positioned at an angle that is greater than about 36 degrees relative to a vertical axis, the shock absorber is not positioned to absorb the force vector that is produced in the generally vertical direction. As a result, such vertical vector forces causes friction in the shock absorbers that inhibits proper function.

Thus, a need exists for a suspension system configured for use with motorcycles having rake greater than about 36 degrees.

SUMMARY OF THE INVENTION

This invention is directed to a suspension system for a front wheel of a vehicle, such as a motorcycle. The suspension system may include a support arm assembly and one or more movement limiting devices, such as a shock absorber. The support arm assembly may include at least one support arm for supporting a front wheel, a support bracket, and a neck. The support arm may be coupled to the support bracket, and the support bracket may be pivotably coupled to the neck so that the support bracket can rotate about an axis that is generally parallel to a longitudinal axis of the support arm. The neck may be rotatably coupled to a frame at a pivot so that the support arm assembly may rotate around an axis generally orthogonal to a longitudinal axis of the motorcycle and generally orthogonal to the axis about which the support bracket may rotate. The support arm assembly may have a first end for supporting the front wheel and a second end that is generally opposite to the first end. The support arm may be pivotably coupled to the frame at the pivot that is proximate to the second end of the support arm so that the support arm can rotate around an axis that is generally orthogonal to a longitudinal axis of the frame and generally orthogonal to a longitudinal axis of the at least one support arm.

The suspension system may also include at least one movement limiting device having a first end configured to be attached to the frame and a second end coupled to the support arm assembly proximate to the second end. In one embodiment, the movement limiting device is coupled to the support arm assembly between the second end of the support arm assembly and the pivot. In another embodiment, the movement limiting device is coupled to the support arm assembly between the first end of the support arm assembly, which is configured to be coupled to a front wheel and the pivot.

BRIEF DESCRIPTION OF THE DRAWINGS

The accompanying drawings, which are incorporated in and form a part of the specification, illustrate preferred embodiments of the presently disclosed invention(s) and, together with the description, disclose the principles of the invention(s). These several illustrative figures include the following.

DETAILED DESCRIPTION OF THE INVENTION

Figure 1:
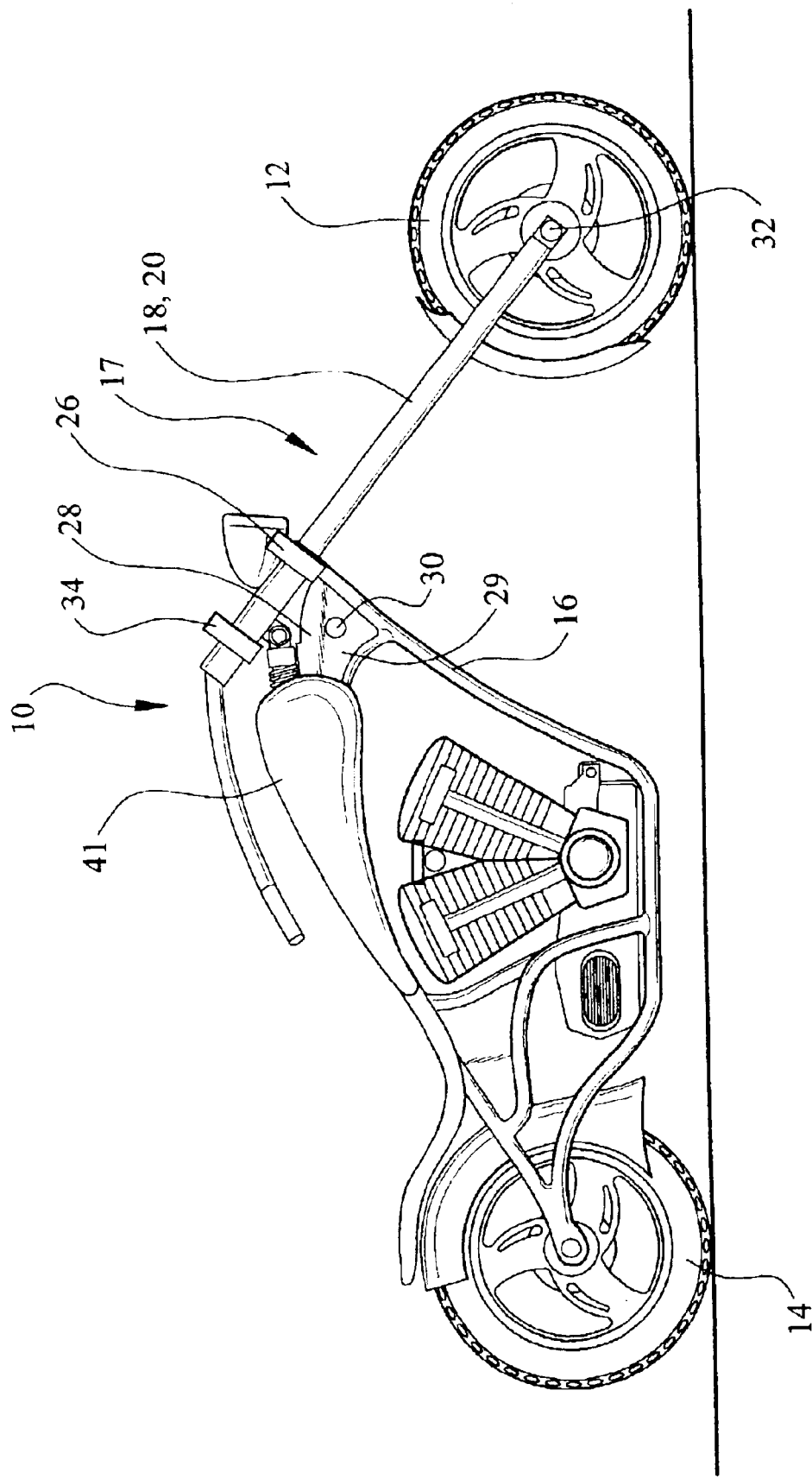
FIG. 1 is a side view of a motorcycle including this invention.

FIGS. 1–5 shows suspension system 10 of this invention. Suspension system 10 may include a support arm assembly 17 and one or more movement limiting devices 24. Motorcycle suspension system 10 is shown coupled to a motorcycle 11 that is composed of front and rear wheels, 12 and 14 respectively, and a frame 16. Front wheel 12 is attached to frame 16 using support arm assembly 17. Support arm assembly 17 may be composed of a support bracket 26, a neck 28, and a plurality of support arms 18 and 20 that are configured to be rotatably attached to front wheel 12. Movement limiting device 24 may be coupled to support arm assembly 17 to limit movement of support arm assembly 17. Suspension system 10 is shown in as configured for a motorcycle. However, suspension system 10 may be used on other vehicles such as, but not limited to, bicycles and other motorized and non-motorized vehicles having a front wheel with rake greater than about 36 degrees.

Figure 2:
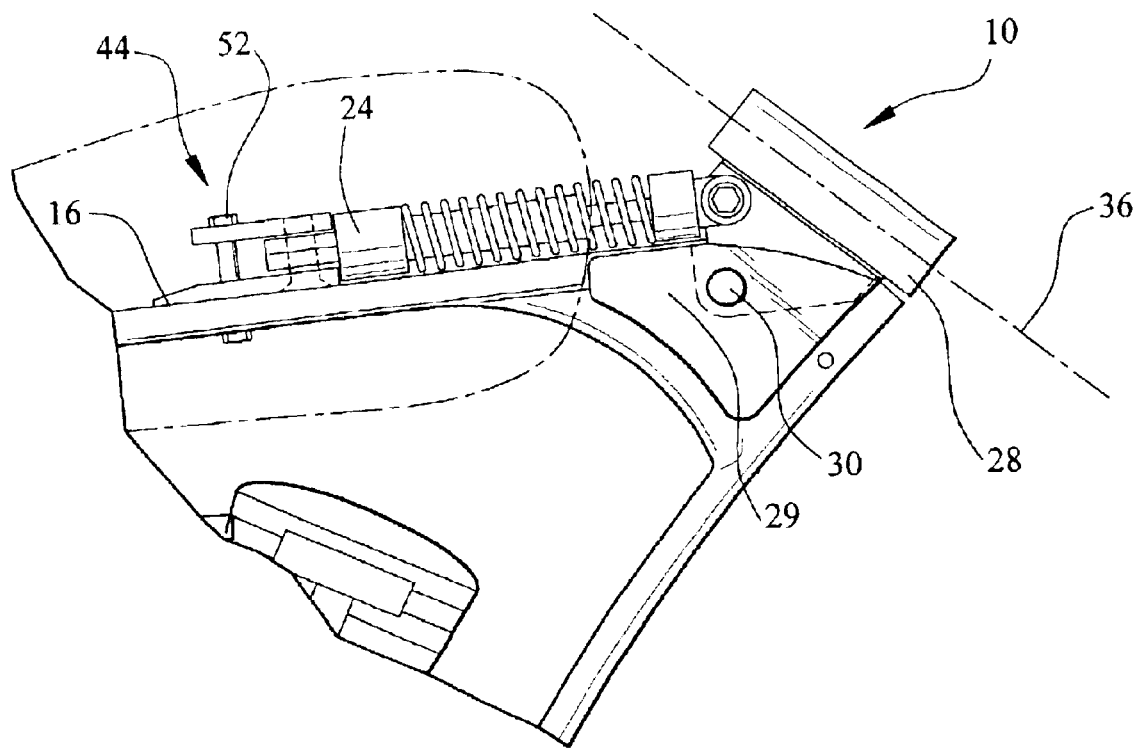
FIG. 2 is a side view of the motorcycle shown in FIG. 1 in a partially assembled state.
Figure 3:
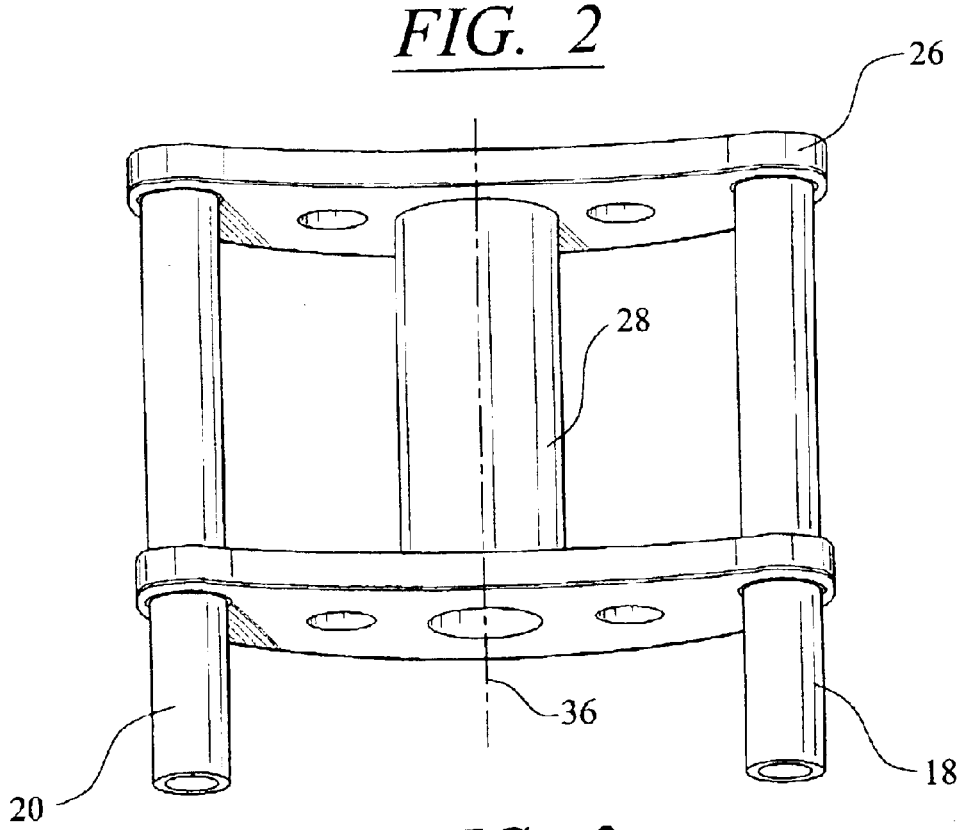
FIG. 3 is a perspective view of the support arms of the motorcycle shown in FIG. 1.

Motorcycle suspension system 10, as shown in FIGS. 1–4, may be configured to absorb forces generated as front wheel 12 encounters changes in terrain or obstacles while motorcycle 10 is in use. In one embodiment, as shown in FIG. 2, suspension system 10 includes at least one movement limiting device 24 coupled to frame 16 at a first end and to support arm assembly 17 at a second end. Suspension system 10 may have one or more movement limiting devices 24 positioned generally horizontal or in another position. In one embodiment, suspension system 10 may include at least two movement limiting devices 24 that are juxtaposed, positioned on opposite sides of frame 16, and coupled to opposite sides of neck 28. In this embodiment, front wheel 12 is attached to first end 32 of two support arms 18 and 20 of frame 22. Support arm 18 is coupled to a first side of front wheel 12, and support arm 20 is coupled to a second side of front wheel 12, which is generally opposite to the first side. Support arms 18 and 20 are juxtaposed and may be coupled together using support bracket 26. Support bracket 26 may be a fork configuration and be coupled to first and second support arms 18 and 20. Support bracket, in one or more embodiments, may have a configuration resembling a triple tree bracket. While this embodiment is shown as having two support arms, the suspension system may be used with motorcycles having one or more support arms having various configurations for supporting front wheel 12.

Figure 4:
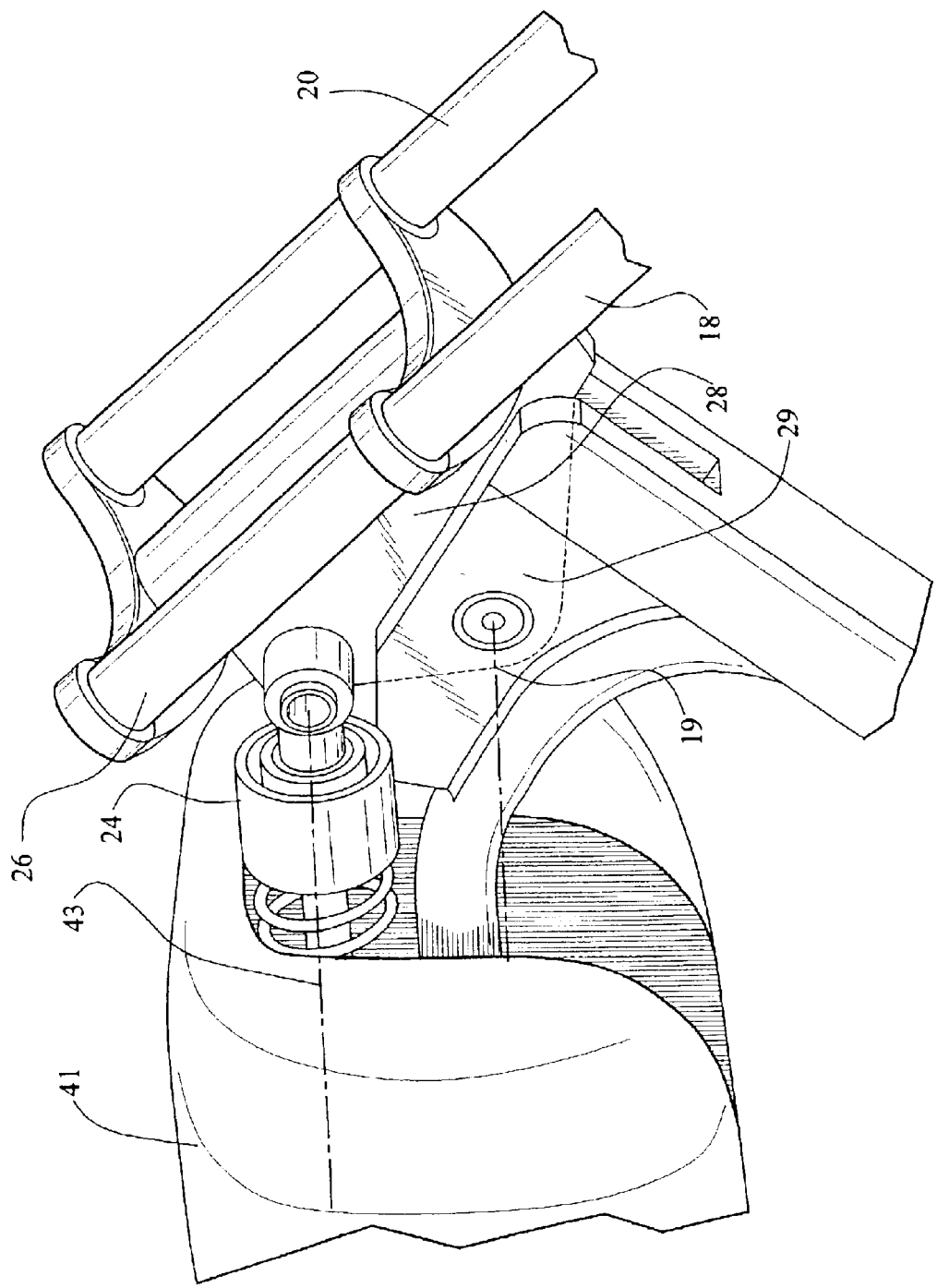
FIG. 4 is a perspective view of the suspension system with a fuel tank installed around a portion of the suspension system.
Figure 8:
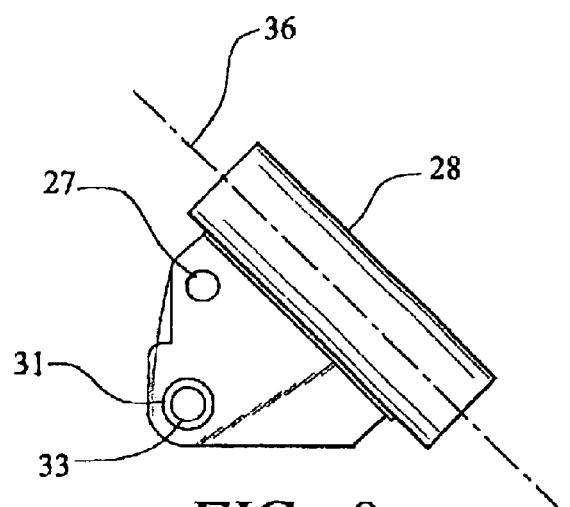
FIG. 8 is a side view of a neck of the suspension system.

In the embodiment shown in FIG. 4, support arms 18 and 20 are coupled to frame 16 using a support bracket 26. Support bracket 26 is rotatably coupled to a neck 28 to allow support bracket 26, and in turn, front wheel 12, to rotate about an axis 36 that is generally parallel to support arms 18 and 20. Neck 28 may be pivotably coupled to frame 16 at pivot 30. Neck 28, as shown in FIG. 8, may be configured to fit between plates 29. Plates 29 may be coupled to frame 16 or may be an integral part of frame 16. Neck 28 may include a hollow tube for receiving support bracket 26. Neck 28 may also include an orifice 27 for receiving a bolt for coupling movement limiting device 24 to neck 28 and an orifice 31 for receiving pivot 30. Orifice 31 may include one or more bearing assemblies 33 for supporting pivot 30. Orifice 31 is preferably sized to receive pivot 30. Pivot 30 may be a pin or other pivotable connection. Support arms 18 and 20, and more specifically, neck 28, are pivotably coupled to frame 16 so that support arm assembly 17 can rotate around an axis 19 that is generally orthogonal to a longitudinal axis 23 of frame 16 and generally orthogonal to a longitudinal axis 36 of support arms 18 and 20.

One or more movement limiting devices 24 may be coupled to frame 16 and to support arm assembly 17, and more specifically, to neck 28. Movement limiting devices 24 may be coupled to neck 28 between a second end 34 of support arm assembly 17 and pivot 30. Movement limiting devices 24 may be coupled to neck using welds, bolts, or other connection methods and devices. Movement limiting devices 24 may be composed of, but are not limited to: shock absorbers; pneumatic shocks; hydraulic shocks; coils; springs; coil overlay shocks, such as those produced by Works Performance Products in Canoga Park, Calif.; and other similar devices. Movement limiting device 24 preferably has sufficient strength to limit the amount of support arm assembly 17 and front wheel 12. In the embodiment shown in FIG. 3, movement limiting device 24 is pivotably coupled to neck 28 using a conventional connection device, such as, but not limited to, a bolt. However, the connection device may include, but is not limited to, conventional components, such as, a pin, rivet, pole, peg, hook, dowel, or other such device.

Figure 6:
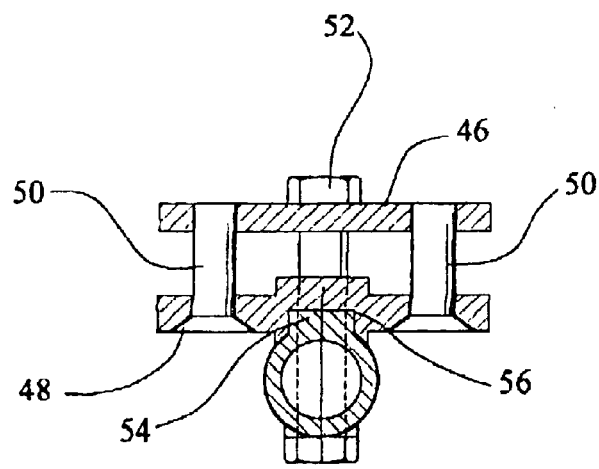
FIG. 6 is a cross-sectional view of an attachment device shown in FIG. 2.
Figure 7:
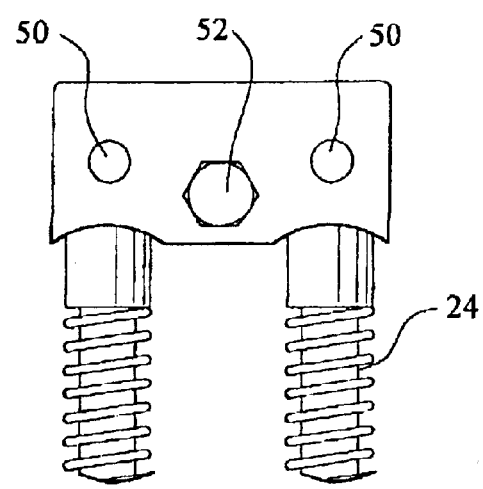
FIG. 7 is a top view of the attachment device shown in FIG. 2.

In one embodiment, as shown in FIGS. 2, 6, and 7, movement limiting device 24 may be coupled to frame 16 with an attachment bracket 44. Attachment bracket 44 may be formed from a top plate 46 and a bottom plate 48. An end of movement limiting device 24 may be positioned between top plate 46 and bottom plate 48. Movement limiting device 24 may be coupled to movement limiting device 24 using pins 50. Top plate 46 may be coupled to bottom plate 48 and coupled to frame 16 using a bolt 52. A key 54 may be attached to frame 16 and a corresponding keyway 56 may be included on a bottom surface of bottom plate 48. Key 54 and keyway 56 may fit tightly together and thus prevent movement alignment device 24 from twisting during use.

Figure 5:
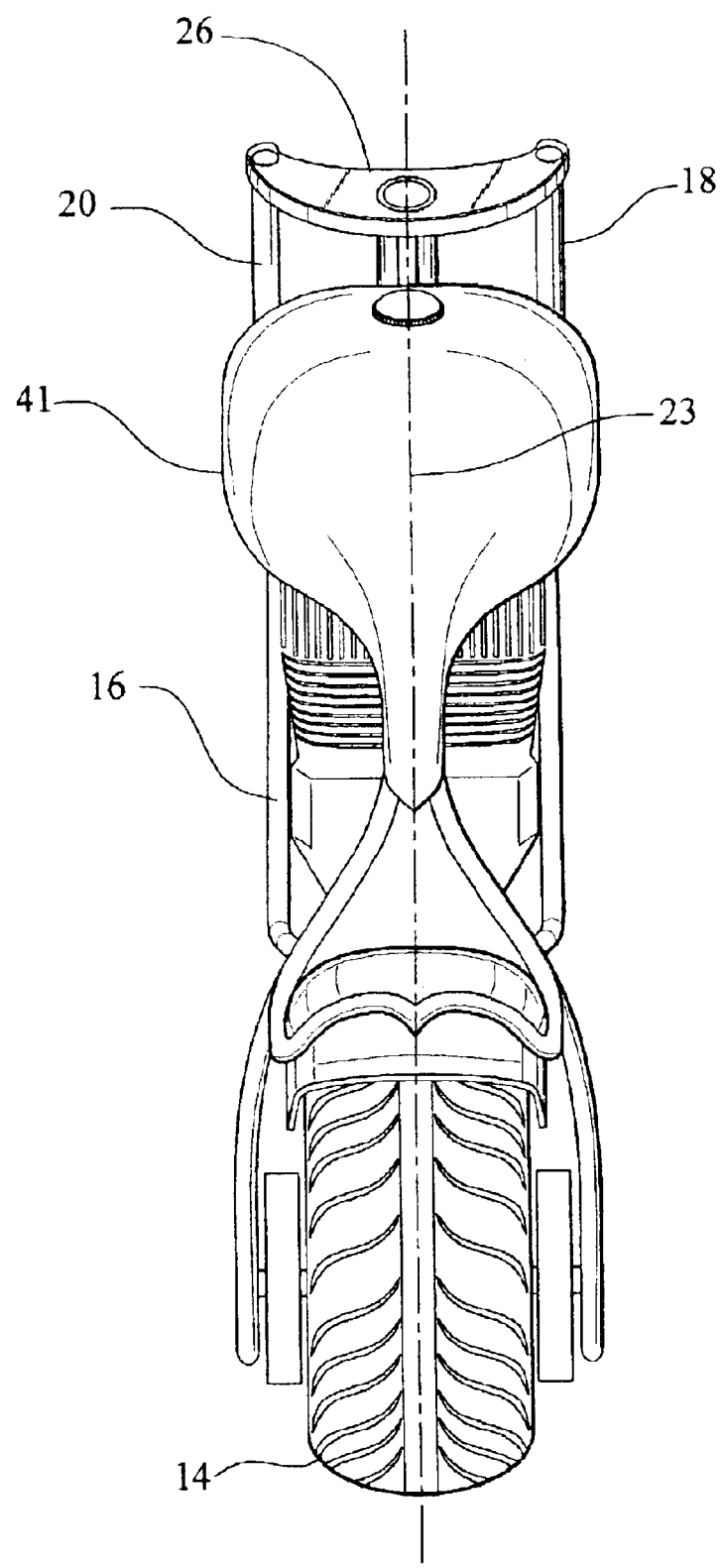
FIG. 5 is a perspective of the motorcycle shown in FIG. 1 in a rear view.

As shown in FIG. 5, a fuel tank 41 may be configured to fit around a portion of suspension system 10. More specifically, fuel tank 41 may include one or more cavities 43 for receiving movement limiting device 24 or other component of suspension system 10. Cavities 43 may be cylindrical or any other shape necessary or suitable to accommodate suspension system 10. In one embodiment, fuel tank 41 may conceal movement limiting device 24 that is positioned generally parallel to a support member and a ground surface upon which motorcycle 10 rests. Fuel tank 41 may be formed from a metal, a plastic, a composite material or other conventional material and may be attached to frame 16 using conventional attachment devices.

Suspension system 10 absorbs forces that front wheel 12 encounters while motorcycle 10 is in use. Specifically, suspension system 10 controls movement of support arm assembly 17 around pivot 30. As front wheel 12 is subjected to a force, front wheel 12 moves upwardly and rotates around pivot 30. Movement limiting device 24 limits the amount of movement of support arm assembly 17 around pivot 30 and, in turn, produces a softer ride for motorcycle 10.

The components of suspension system 10 may be formed of a variety of materials. For instance, the components may be formed from materials such as, but not limited to, stainless steel, aluminum, corrosion resistant materials, and other materials having sufficient strength. The components may all be formed from the same material or may be formed from different materials.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A suspension system for supporting a front wheel of a vehicle, comprising:

a support arm assembly comprising at least one support arm having a first end and a second end, the first end of the at least one support arm supporting the front wheel, and the support arm assembly pivotably coupled to a frame of the vehicle at a pivot proximate to the second end of the at least one support arm so that the at least one support arm assembly can rotate about an axis that is generally orthogonal to a longitudinal axis of the frame and generally orthogonal to a longitudinal axis of the at least one support arm assembly; and at least one movement limiting device having a first end and a second end, the first end of the at least one movement limiting device is coupled to the frame and the second end of the at least one movement limiting device is coupled to the support arm assembly between the pivot and the second end of the support arm assembly generally opposite to the first end coupled to the front wheel to limit movement of the at least one support arm about the pivot.

2. The suspension system of claim 1, wherein the support arm assembly comprises a neck rotatably coupled to a frame at the pivot so that the neck can rotate about an axis that is generally orthogonal to a longitudinal axis of the frame.

3. The suspension system of claim 2, wherein the support arm assembly further comprises a support bracket rotatably coupled to the neck and coupled to the at least one support arm, wherein the support bracket is rotatable about the axis generally parallel to the longitudinal axis of the at least one support arm.

4. The suspension system of claim 1, wherein the at least one movement limiting device is coupled to the support arm assembly between the second end of the at least one support arm and the pivot.

5. The suspension system of claim 4, wherein the at least one movement limiting device is positioned generally horizontal.

6. The suspension system of claim 1, wherein the at least one movement limiting device comprises at least one spring.

7. The suspension system of claim 6, wherein the at least one movement limiting device further comprises at least one hydraulic chamber.

8. The suspension system of claim 1, wherein the at least one movement limiting device comprises at least one hydraulic chamber.

9. The suspension system of claim 1, further comprising at least one fuel tank having a cavity in which the at least one movement limiting device is concealed.

10. The suspension system of claim 1, wherein the at least one movement limiting device is fixedly attached to the frame.

11. The suspension system of claim 1, wherein the at least one movement limiting device is coupled to the frame with an attachment bracket.

12. The suspension system of claim 11, wherein the attachment bracket comprises a bracket coupled to the frame using a key and keyway.

13. The suspension system of claim 11, wherein the attachment bracket comprises a top bracket coupled to a bottom bracket with at least one pin.

14. The suspension system of claim 2, wherein the first end of the at least one support arm further comprises a fork having at least first and second arms for supporting the front wheel.

15. The suspension system of claim 11, wherein the at least one support arm comprises a first support arm coupled to a first side of the front wheel and a second support arm coupled to the second side of the front wheel.

16. The suspension system of claim 1, wherein the at least one movement limiting device is coupled to the at least one support arm between the first end of the at least one support arm and the pivot.

17. A suspension system for supporting a front wheel of a vehicle, comprising:
  a support arm assembly comprising:
    a neck rotatably coupled to a frame at a pivot;
    a support bracket rotatably coupled to the neck and coupled to at least one support arm;
    the at least one support arm having a first end coupled to the front wheel and a second end coupled to the support bracket; and
  wherein the support arm assembly is pivotably coupled to a frame at the pivot so that the at least one support arm assembly can rotate about an axis that is generally orthogonal to a longitudinal axis of the frame and generally orthogonal to a longitudinal axis of the at least one support arm assembly; and
  at least one movement limiting device having a first end and a second end, the first end of the at least one movement limiting device coupled to the frame and the second end of the at least one movement limiting device is coupled to the support arm assembly between the pivot and the second end of the support arm assembly generally opposite to the first end coupled to the front wheel to prevent the at least one support arm from freely rotating about the pivot.

18. The suspension system of claim 17, wherein the at least one movement limiting device comprises at least one spring.

19. The suspension system of claim 18. wherein the at least one movement limiting device further comprises at least one hydraulic chamber.

20. The suspension system of claim 17, wherein the at least one movement limiting device comprises at least one hydraulic chamber.

21. The suspension system of claim 17, further comprising at least one fuel tank having a cavity in which the at least one movement limiting device is concealed.

22. The suspension system of claim 17, wherein the at least one movement limiting device is fixedly attached to the frame.

23. The suspension system of claim 17, wherein the first end of the at least one support arm further comprises a fork having at least first end second arms for supporting the front wheel, wherein the first arm is coupled to a first side of the front wheel and the second arm is coupled to a second side of the front wheel.

24. The suspension system of claim 17, wherein the at least one movement limiting device is coupled to the at least one support arm between the first end of the at least one support arm and the pivot.

25. A motorcycle, comprising:
  a frame having at least one front wheel and at least one rear wheel; and
  a suspension system for the front wheel, comprising:
    a support arm assembly comprising at least one support arm having a first end and a second end, the first end of the at least one support arm coupled to the front wheel, and the support arm assembly pivotably coupled to the frame at a pivot proximate to the second end of the at least one support arm so that the at least one support arm assembly can rotate about an axis that is generally orthogonal to a longitudinal axis of the frame and generally orthogonal to a longitudinal axis of the at least one support arm assembly; and
    at least one movement limiting device having a first and a second end, the first end of the at least one movement limiting device is coupled to the frame and the second end of the at least one movement limiting device is coupled to the support arm assembly between the pivot and the second end of the support arm assembly generally opposite to the first end coupled to the front wheel to prevent the at least one support arm from freely rotating about the pivot.

26. The motorcycle of claim 25, wherein the support arm assembly comprises a neck rotatably coupled to the frame at the pivot so that the neck can rotate about an axis that is generally orthogonal to a longitudinal axis of the frame.

27. The motorcycle of claim 25, wherein the support arm assembly further comprises a support bracket rotatably coupled to the neck and coupled to the at least one support arm, wherein the support bracket is rotatable about the axis generally parallel to the longitudinal axis of the at least one support arm.

28. The motorcycle of claim 25, wherein the at least one movement limiting device is coupled to the support arm assembly between the second end of the at least one support arm and the pivot.

29. The motorcycle of claim 25, wherein the at least one movement limiting device comprises at least one spring and at least one hydraulic chamber.

30. The suspension system of claim 25, further comprising at least one fuel tank having a cavity in which the at least one movement limiting device is concealed.

31. The suspension system of claim 25, wherein the at least one movement limiting device is coupled to the frame with an attachment bracket.

32. The suspension system of claim 31, wherein the attachment bracket comprises a bracket coupled to the frame using a key and keyway.

33. The suspension system of claim 31, wherein the attachment bracket comprises a top bracket coupled to a bottom bracket with at least one pin.

* * * * *